(12) United States Patent
Hoefer et al.

(10) Patent No.: US 9,175,614 B2
(45) Date of Patent: Nov. 3, 2015

(54) GAS FUEL ADMISSION SYSTEM FOR A GAS FIRED ENGINE

(75) Inventors: Wolfgang Hoefer, Senoia, GA (US);
Manfred Meissner, Minier, IL (US);
Bert Ritscher, Altenholz (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 806 days.

(21) Appl. No.: 13/502,112

(22) PCT Filed: Oct. 12, 2010

(86) PCT No.: PCT/EP2010/006217
§ 371 (c)(1),
(2), (4) Date: Apr. 13, 2012

(87) PCT Pub. No.: WO2011/045026
PCT Pub. Date: Apr. 21, 2011

(65) Prior Publication Data
US 2012/0199102 A1    Aug. 9, 2012

(30) Foreign Application Priority Data
Oct. 16, 2009   (EP) .................................. 09013090

(51) Int. Cl.
*F02D 19/02*   (2006.01)
*F02B 1/08*    (2006.01)

(52) U.S. Cl.
CPC .............. *F02D 19/027* (2013.01); *F02B 1/08* (2013.01); *F02D 19/022* (2013.01); *Y02T 10/32* (2013.01)

(58) Field of Classification Search
CPC ....... F02B 1/08; F02D 19/022; F02D 19/027; F02D 19/0647; Y02T 10/32; F02M 21/0242; F02M 21/02; F02M 21/023
USPC .......... 701/103, 104; 123/457, 458, 459, 463, 123/465, 506, 511, 525, 526, 527, 529, 123/27 GE, 198 D, DIG. 12, DIG. 13; 60/39.465; 73/1.57; 137/486, 487.5
See application file for complete search history.

(56) References Cited

U.S. PATENT DOCUMENTS 4,550,747 A * 11/1985 Woodworth et al. ...... 137/487.5
5,329,908 A    7/1994 Tarr et al.
(Continued)

FOREIGN PATENT DOCUMENTS

CN    101443542 B    11/2011
CN    101418752      2/2013
(Continued)

OTHER PUBLICATIONS

European Patent Office, PCT International Search Report for international application No. PCT/EP2010/006217, dated Apr. 21, 2011.
(Continued)

*Primary Examiner* — Erick Solis
*Assistant Examiner* — Carl Staubach (57) ABSTRACT

The present disclosure refers to a gas fuel admission system for a gas fired engine. A gas pressure regulating unit includes a gas pressure regulating unit inlet and a gas pressure regulating unit outlet. The gas pressure regulating unit is configured to receive gas and to discharge the gas at an injection pressure. An engine gas inlet is configured to direct gas into the at least one combustion chamber. A gas admission valve is configured to admit the gas having an injection pressure at a predetermined time for a predetermined duration into the engine gas inlet. A gas pressure relief device is fluidly connected to the gas conduit and it is configured to relieve overpressure of the gas in the gas supply conduit, if a pressure differential between the injection gas pressure and the intake air pressure is above a predetermined threshold. A specific engine control module is configured to control the gas admission valve in response to inputs from various sensing devices.

20 Claims, 3 Drawing Sheets

(56) References Cited

U.S. PATENT DOCUMENTS

| | | | |
|---|---|---|---|
| 5,355,854 A * | 10/1994 | Aubee | 123/431 |
| 5,623,907 A | 4/1997 | Cotton et al. | |
| 5,868,121 A | 2/1999 | Brown et al. | |
| 5,983,714 A | 11/1999 | Izumiura et al. | |
| 6,446,616 B1 | 9/2002 | Kabat et al. | |
| 7,140,354 B1 | 11/2006 | Hashemi | |
| 7,406,950 B2 | 8/2008 | Sawut et al. | |
| 8,760,101 B2 * | 6/2014 | Babando et al. | 318/471 |
| 2009/0055077 A1 | 2/2009 | Schule | |
| 2011/0094476 A1 * | 4/2011 | Ibrahim et al. | 123/456 |

FOREIGN PATENT DOCUMENTS

| | | |
|---|---|---|
| DE | 10 2004 060 905 A1 | 6/2006 |
| WO | WO 99/32774 | 7/1999 |

OTHER PUBLICATIONS

European Patent Office, European Search Report for European Patent Application No. EP 09 01 3090, dated Feb. 25, 2010.

* cited by examiner

GAS FUEL ADMISSION SYSTEM FOR A GAS FIRED ENGINE

CROSS REFERENCE TO RELATED APPLICATION

This application is a national phase application based on PCT/EP2010/006217, filed Oct. 12, 2010, and claims the priority of European Patent Application Number 09013090.7, filed Oct. 16, 2009, both of which are incorporated herein by reference.

TECHNICAL FIELD

The present disclosure generally refers to a gas fuel admission system for a gas fired engine having at least one combustion chamber supplied with intake air at an intake air pressure, and in particular to, e.g., a natural gas fuel admission system for a natural gas fired engine.

Furthermore, the present disclosure refers to a method for avoiding engine shutdowns of a gas fired engine as a consequence of possible load rejection events.

In addition, the present disclosure refers to a power generation unit comprising at least one electric generator and at least one gas fired engine configured to mechanically drive the at least one electric generator.

Finally, the present disclosure refers to a gas pressure relief device configured to be used in a gas fuel admission system for a gas fired engine for avoiding engine shutdowns of the engine as a consequence of possibly occurring load rejection events.

BACKGROUND

Gas fired engines as, e.g., natural gas fired engines, may use gas admission valves to admit the natural gas into the intake channel in spark ignited internal combustion engines. These days in particular solenoid operated gas admission valves (SOGAVs) are used. A SOGAV may be an electrically actuated, high response gas admission valve for in-manifold or port fuel admission. The SOGAV may be designed for use on four-cycle, turbocharged, natural gas or dual-fuel engines. Normally, one SOGAV is required for each cylinder of the engine.

In U.S. Pat. No. 5,329,908 A a compressed natural gas injection system for gaseous fuel engines includes an electronic control unit controlling injection timing to inject compressed gas into cylinders as each piston nears its top dead center position.

U.S. Pat. No. 5,623,907 discloses a liquid propane fuel storage and delivery system for motor vehicle internal combustion engines. This known system includes fuel delivery conduits for communicating propane fuel between a storage tank and engine fuel injectors, and an electric fuel pump.

A vent system for gaseous fuel vehicles is disclosed in U.S. Pat. No. 6,446,616 A. Here, a ventilation system for gas fueled vehicles has a pressure regulator and a relief valve coupled to a fuel line and a vent line, such that gas fuel is coupled to vent line upon an operation of the regulator or the valve.

DE 10 2004 060 905 A1 discloses an internal combustion engine, e.g. a gas line engine and a control method for a vehicle. The control method involves reducing high pressure of fuel at gaseous state up to lowest pressure by a pressure reducer, and controlling lowest pressure by a signal from a control device.

U.S. Pat. No. 7,140,354 B1 discloses a compressed gaseous fuel system for an internal combustion engine. When the pressure in the fuel rail is higher than desired, fuel is withdrawn from the fuel rail, recompressed, and injected into the fuel system for the control regulator. The fuel is withdrawn from the fuel rail by means of a pump. The use of a pump may be likely to result in an inappropriately long response time.

U.S. Pat. No. 7,406,950 B2 refers to a fuel supply apparatus pressure feeding a liquid fuel which tends to be evaporated in comparison with a gasoline in a liquid state to an injector from a fuel tank so as to supply to an engine. Here, a return-less type engine fuel supply apparatus comprises an electronic control unit drive controlling a fuel pipe and injectors and pressurizing a liquefied gas fuel stored in a fuel tank by a fuel pump so as to feed it to the injector through the fuel supply pipe line and supply it to the engine. An electronic control unit feedback controls the operation of the fuel pump on the basis of the detected fuel pressure in such a manner that the fuel injection pressure maintains a predetermined target pressure.

A system for detecting failure of a fuel pressure sensor in an internal combustion engine is disclosed in U.S. Pat. No. 5,983,714 A. In this system, an index indicative of a ratio of the fuel pressure fluctuation relative to the manifold of the absolute fluctuation is compared to reference values which define a range. Sensor failure is discriminated when the index is found to have remained outside of the range for the predetermined maximum time. This system enables rapid and accurate detection of fuel pressure sensor abnormality or failure.

U.S. Pat. No. 5,868,121 refers to a fuel pressure release system for a dual fuel engine including at least one gas use fuel admission valve positioned between a gaseous fuel inlet region and an air intake region. The system includes a first pressure sensor positioned in the gaseous fuel inlet region and a second pressure sensor positioned in the air intake region. An electronic controller is connected to the first pressure sensor and the second pressure sensor. A gaseous fuel vent path extends between the gas use fuel inlet region and a portion of an air intake path of the engine. A vent valve is positioned along the gaseous fuel vent path and is connected to the electronic control of a control thereby. When the differential pressure across the gaseous fuel admission valve exceeds a predetermined level the fuel vent valve is opened to relieve the pressure. This known system is configured to operate in a dual fuel mode. Furthermore, if no dual fuel mode is desired, the vent valve is closed. In dual fuel mode the check of the differential pressure might not provide a solution for a problem as mentioned below.

A problem which may arise in gas fired engines supplied with gas fuel via a gas fuel admission system comprising a gas fuel admission device arranged in relation to a combustion chamber of the engine is that, as a result of an instantaneous load change, where the engine runs at relatively high load and then suddenly under a low load, the engine may over-speed and, consequently, the engine may completely shut down due to an inability to resume fuel injection.

The present disclosure is directed, at least in part, to improving or overcoming one or more aspects of prior gas fired engines using gas admission devices, e.g. SOGAVs. In particular, the present disclosure may be directed to avoid engine shutdowns of a gas fired engine as a consequence of possible load rejection events.

SUMMARY

According to a first aspect of the present disclosure, a gas fuel admission system for a gas fired engine having at least one combustion chamber supplied with intake air having an intake air pressure may comprise a gas pressure regulating unit including a gas pressure regulating unit inlet and a gas pressure regulating unit outlet. The gas pressure regulating unit may be configured to receive gas at a supply pressure at the gas pressure regulating inlet and to discharge the gas at an injection pressure at the gas pressure regulating unit outlet. The injection pressure may be less than the supply pressure. The gas fuel admission system may further comprise a gas supply conduit. An engine gas inlet may be configured to direct gas into the at least one combustion chamber. A gas admission valve may have a valve inlet and a valve outlet. The valve inlet may be fluidly connected to the gas pressure regulating unit outlet via the gas supply conduit, and the valve outlet may be being fluidly connected to the engine gas inlet. The gas admission valve may be configured to admit the gas having the injection pressure at a predetermined time for a predetermined duration into the engine gas inlet. Additionally, the gas fuel admission system may further comprise a gas pressure relief device fluidly connected to the gas conduit. The gas pressure relief valve may be configured to relieve overpressure of the gas in the gas conduit, if a pressure differential between the injection gas pressure and the intake air pressure is above a predetermined threshold. A first sensing device may be configured to sense the injection gas pressure and a second sensing device may be configured to sense the intake air pressure.

Said gas fuel admission system may comprise an engine control module. The engine control module may be configured to control the gas admission valve so that gas to be burnt in the at least one combustion chamber of the gas fired engine is admitted into the at least one combustion chamber. The engine control module may be further configured to communicate with both the first sensing device and the second sensing device. The engine control module may be additionally configured to check whether or not the engine speed of the gas fired engine is above a predetermined blow off threshold, and/or whether or not an engine speed increase is equal to or greater than a predetermined speed increase threshold, and/or whether or not a pressure differential increase of the pressure differential between the injection gas pressure and the intake air pressure is above a predetermined pressure differential increase threshold. Furthermore, the engine control module may be further configured to control the gas pressure relief device so that the gas pressure relief device relieves overpressure of the gas in the gas conduit only, if the engine speed of the gas fired engine is above the predetermined blow off threshold, and/or the engine speed increase is equal to or greater than the predetermined speed increase threshold, and/or the pressure differential increase of the pressure differential between the injection gas pressure and the intake air pressure is above the predetermined pressure differential increase threshold, and the pressure differential between the injection gas pressure sensed by the first sensing device and the intake air pressure sensed by the second sensing device is above the predetermined threshold.

According to a second aspect of the present disclosure, a power generation unit may comprise at least one electric generator configured to convert mechanical energy into electrical energy, at least one gas fired engine configured to drive directly or indirectly the at least one electric generator, and a gas fuel admission system for the gas fired engine. The gas fuel admission system may be configured as mentioned above.

A further aspect of the present disclosure refers to a method for avoiding engine shutdowns of a gas fired engine as a consequence of load rejection events. The gas fired engine may be equipped with at least one gas admission valve configured to admit the gas having an injection pressure at a predetermined time for a predetermined duration into an engine gas inlet. The engine may further comprise a gas pressure regulating unit outlet, and a gas supply conduit connecting the gas pressure regulating unit outlet and the at least one gas admission valve. The method may comprise:

a) checking whether or not the engine speed of the gas fired engine is above a predetermined blowoff threshold, and/or b) checking whether or not an engine speed increase is equal to or greater than a predetermined speed increase threshold, and/or c) checking whether or not a pressure differential increase of the pressure differential between the injection gas pressure and the intake air pressure is above a predetermined pressure differential increase threshold, and d) reducing the gas pressure in the gas supply conduit only, if:

a1) the engine speed of the gas fired engine is above the predetermined blowoff threshold, and/or b1) the engine speed increase is equal to or greater than the predetermined speed increase threshold, and/or c1) the pressure differential increase of the pressure differential between the injection gas pressure and the intake air pressure is above the predetermined pressure differential increase threshold, and d1) the pressure differential between the infection gas pressure and the intake air pressure is above the predetermined threshold.

A further aspect of the present disclosure refers to the use of a gas pressure relief device configured to be fluidly connected to a gas supply conduit connecting a gas pressure regulating unit outlet and a gas admission valve of a gas fired engine having at least one combustion chamber, and to relieve overpressure of the gas in the gas supply conduit, if a pressure differential between an injection gas pressure of the gas in the gas supply conduit and an intake air pressure is above a predetermined threshold, for avoiding engine shutdowns of the gas fired engine as a consequence of load rejection events.

It is to be understood that both the foregoing general description and the following detailed description are exemplary and explanatory only and are not restrictive of the disclosure.

Other features and aspects of this disclosure will be apparent to the skilled person based upon the following description, the accompanying drawings and the attached claims.

DETAILED DESCRIPTION

Figure 1:
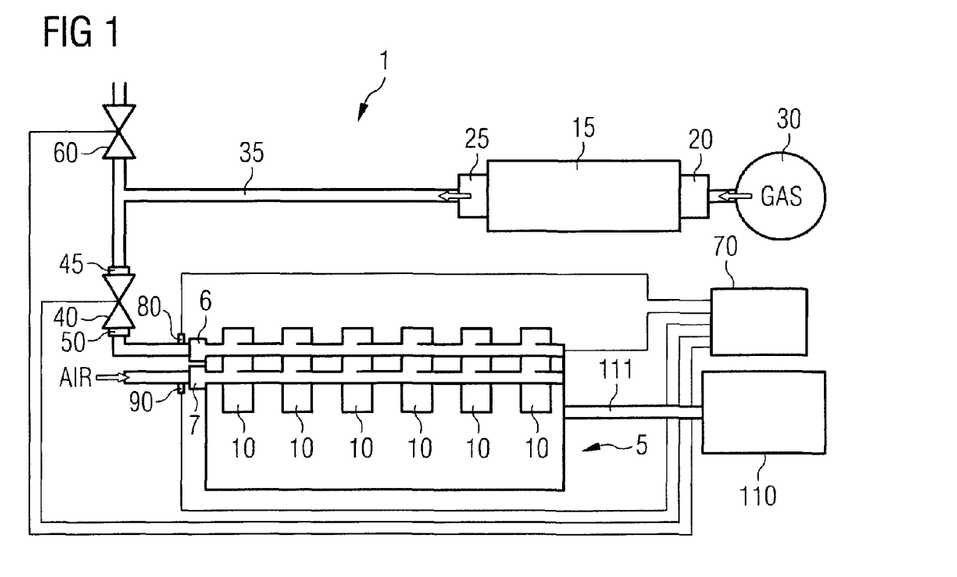
FIG. 1 shows a schematic block diagram of an exemplary embodiment of a gas fired engine according to a first exemplary embodiment of the present disclosure.

A first exemplary embodiment of the present disclosure is schematically shown in FIG. 1. Here, a gas fired engine 5 may comprise one or more combustion chambers 10 supplied with gas, e.g. natural gas, and intake air. The combustion chambers 10 may be connected to an engine gas inlet 6 and an intake air inlet 7. In one exemplary embodiment of such a gas fired engine 5 the engine gas inlet 6 and the intake air inlet 7 may be combined in one unit. The construction and design of the gas fired engine 5 may be identical with known gas fired engines.

As shown in FIG. 1, the gas fired engine 5 may be connected to an electric generator 110 via, e.g., a shaft 111 driven by the gas fired engine 5. An engine control module 70 may be connected with the gas fired engine 5 and configured to control the gas fired engine 5 and may be further connected with units/devices associated with the operation of the gas fired engine 5. For example, a first sensing device 80 configured to sense the injection gas pressure at, for example, the engine gas inlet 6 may be configured to sense the injection gas pressure after it has passed a gas admission device 40, or before it passes the gas admission device 40. The first sensing device 80 may be connected to the engine control module 70. A second sensing device 90 may be arranged at an inlet air conduit or manifold from which the inlet air at the inlet air pressure is supplied to the combustion chamber 10. The second sensing device 90 may be configured to sense the pressure of the intake air flowing into the combustion chamber 10. In addition, the second sensing device may be connected to the engine control module 70. Furthermore, the engine control module 70 may be connected to the gas pressure relief valve 60 so that the gas pressure relief valve 60 may be opened upon a opening signal from the engine control module 70.

In the following, a gas fuel admission system 1 is explained in detail with reference to, e.g., FIG. 1. The gas fuel admission system 1 shown in FIG. 1 may comprise a gas pressure regulating unit 15 including a gas pressure regulating unit inlet 20 and a gas pressure regulating unit outlet 25. The gas pressure regulating unit 15 may be configured to receive gas at a supply pressure at the gas pressure regulating unit inlet 20 supplied by a gas fuel source 30. The gas fuel pressure of the gas fuel supplied by the gas fuel source 30 may be higher than the gas fuel pressure appropriate for supplying the gas fuel into the combustion chamber 10 of the gas fired engine 5. Therefore, the gas pressure regulating unit 15 may be configured to reduce the gas fuel pressure to an injection pressure appropriate for supplying or injecting the gas fuel into the combustion chamber 10. Accordingly, the gas pressure regulating unit 15 may be configured to discharge the gas at an injection pressure, which may be lower than the supply pressure, at the gas pressure regulating unit outlet 25.

A gas supply conduit 35 may be arranged to fluidly connect the gas pressure regulating unit outlet 25 with a valve inlet 45 of the gas admission valve 40. Gas fired engines often comprise more than one combustion chamber 10, and it may be appropriate that each combustion chamber 10 is associated with its own gas admission valve 40. In this case, the gas supply conduit 35 may be configured to connect the gas pressure regulating unit outlet 25 with all valve inlets 45 of the gas admission valves 40. Each gas admission valve 40 may have not only the valve inlet 45, but a valve outlet 50. The valve outlet 50 of each gas admission valve 40 may be fluidly connected to the engine gas inlet 6. The gas admission valve 40 may be configured to admit the gas having the injection pressure at a predetermined time for a predetermined duration into the engine gas inlet of, for example, each combustion chamber 10.

Accordingly, even if it is not shown in FIG. 1, each combustion chamber 10 may be provided with its own gas admission valve 40, and, accordingly, all the valve inlets 45 of each gas admission valve 40 are connected via the gas supply conduit 35 with the gas pressure regulating unit outlet 25.

In addition, a gas pressure relief device 60 may be provided in an exemplary embodiment of the present disclosure. The gas pressure relief device 60 may be fluidly connected to the gas supply conduit 35, or in other words, for example, a gas pressure relief device 60 may be provided in fluid connection with the at least one valve inlet 45.

The shown exemplary embodiment of a gas fired engine according to the present disclosure may be connected with an electric generator 110. Via a shaft 111 driven by the engine 5, the electric generator is being driven for generating electric power.

Contrary to the exemplary embodiment shown in FIG. 1, electric generator 100 may be omitted, and the shaft 111 of the gas fired engine 5 may be configured to mechanically drive a vehicle, e.g. a construction machine, or a ship's screw of a ship.

A further exemplary embodiment of a gas fuel admission system in accordance with the present disclosure may comprise an engine control module 70 configured to control the gas admission valves 40 so that gas to be burnt in the at least one combustion chamber 10 of the gas fired engine 1 is admitted into the at least one combustion chamber.

Another exemplary embodiment of the present gas fuel admission system may comprise a first sensing device 80 configured to sense the injection gas pressure and a second sensing device 90 configured to sense the intake air pressure. An engine control module 70 may be configured to communicate with both the first sensing device 80 and the second sensing device 90. The engine control module 70 may be further configured to control the gas pressure relief device 60 so that the gas pressure relief device 60 relieves overpressure of the gas in the gas conduit 35, if the pressure differential between the injection gas pressure sensed by the first sensing device 80 and the intake air pressure sensed by the second sensing device 90 is above the predetermined threshold.

According to another exemplary embodiment of a gas fuel admission system according to the present disclosure the gas pressure relief device 60 may be configured to automatically relief overpressure of the gas in the gas supply conduit 35, if the pressure differential is above the predetermined threshold, by applying the intake air pressure and the injection gas pressure on appropriate inlets of the gas pressure relief device 60.

Basically, the gas admission valve may be configured as a solenoid operated gas admission valve 40.

In accordance with an exemplary embodiment of the present gas fuel admission system according to the present disclosure the gas fired engine is, for example, a natural gas fired engine supplied with natural gas.

Another exemplary embodiment of the present disclosure refers to a gas pressure relief device 60 configured to be fluidly connected to a gas supply conduit 35 connecting a gas pressure regulating unit outlet 25 and an gas admission valve 40 of a gas fired engine 1 having at least one combustion chamber 10, and to relieve overpressure of the gas in the gas supply conduit 35, if a pressure differential between an injection gas pressure of the gas in the gas supply conduit 35 and an intake air pressure is above a predetermined threshold.

According to a further exemplary embodiment of the gas pressure relief device according to the present disclosure, the gas pressure relief device may be configured as a gas pressure relief valve 60, which is, e.g., sized so that such a rapid pressure drop in the gas supply conduit 35 may be reached resulting in that engine shutdowns of the gas fired engine 5 as a consequence of load rejection events can be avoided.

In another exemplary embodiment of the gas pressure relief device 60 according to the present disclosure, the gas pressure relief device 60 may be configured such that it relieves overpressure of the gas in the gas supply conduit 35 as long as the pressure differential between the injection gas pressure of the gas in the gas supply conduit 35 and the intake air pressure is above the threshold which is set against the construction of the at least on gas admission valve 60.

Figure 2:
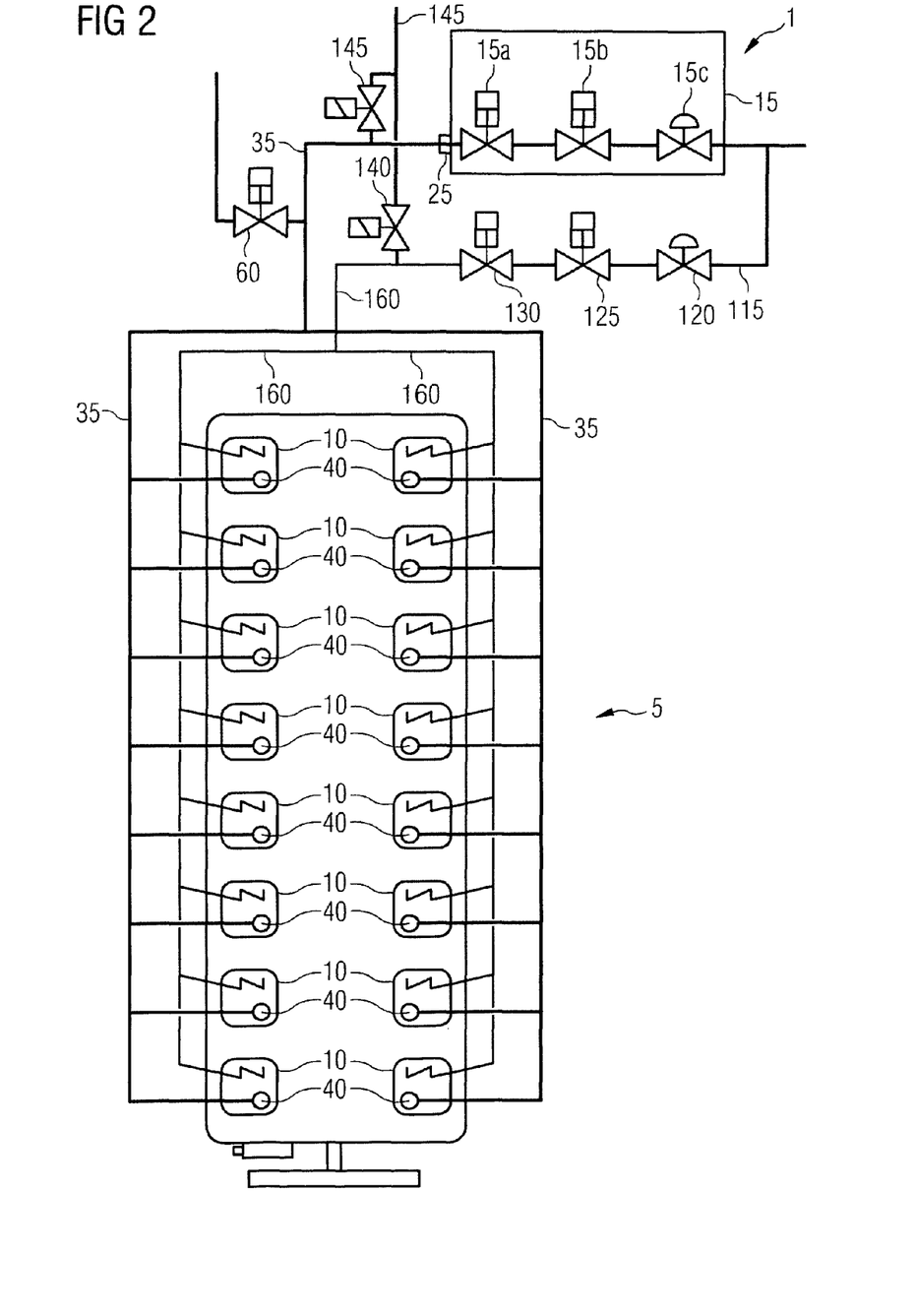
FIG. 2 shows a schematic block diagram of another exemplary embodiment of a gas fired engine according to a second exemplary embodiment of the present disclosure.

A second exemplary embodiment of a gas fuel admission system 1 for a gas fired engine 5 is shown in FIG. 2. Here, the gas fired engine 5 may comprise sixteen cylinders and, accordingly, sixteen combustion chambers 10. In this specific exemplary embodiment of a gas fired engine 5 each combustion chamber 10 is provided with its own associated gas admission valve 40, which may be constructed as a SOGAV. In addition, each combustion chamber 10 may be provided with, in addition to a main chamber manifold supplied with the gas fuel flowing in the gas supply conduit 35, a prechamber also supplied with gas fuel via a prechamber fuel manifold 160.

As the first exemplary embodiment shown in FIG. 1, the second exemplary embodiment of the gas fuel admission system 1 shown in FIG. 2 is provided with a gas pressure regulating unit 15. In this exemplary embodiment of the present disclosure, the unit 15 may comprise a plurality of pressure regulators 15*a*, 15*b*, and a lock valve 15*c*. Identical to the exemplary embodiment shown in FIG. 1 the gas supply conduit 35 connects the gas pressure regulating unit outlet 25 with the main chamber fuel manifold supplying each SOGAV 40 of each combustion chamber 10 of the gas fired engine 5 with gas at the injection pressure. A normal venting valve 145 is connected with a venting line 150 and the gas supply conduit 35. This venting valve 145 may serve for relieving overpressure in the gas supply conduit 35 in case that the engine 5 was stopped. The only purpose of this venting valve 145 is to avoid overpressure in the gas supply conduit 35 after the engine 5 was stopped and, consequently, damages due to any overpressure in the gas supply line 35 and the connected main chamber fuel manifold. Accordingly, the venting valve 145 may be constructed to relieve overpressure over a longer duration, e.g. several minutes.

As shown in FIG. 2, the engine 5 is also provided with a prechamber gas fuel supply path. This prechamber gas fuel supply path may comprise a gas fuel supply conduit 115 connected to the gas source 30 (in FIG. 2 not shown). This gas fuel supply conduit 115 ends in the prechamber gas fuel manifold line 160 supplying gas fuel to the prechamber fuel manifold of the prechambers of the combustion chambers 10 of the engine 5. Various pressure regulators 125, 135 may be provided for regulating the gas fuel prechamber pressure in the manifold 160. In addition, a stop valve 120 may be provided upstream of the valve 125.

Like the gas fuel supply conduit 35 the prechamber gas fuel manifold supply line 160 is connected to the venting line 150 via a venting valve 140 constructed as the venting valve 145. The venting valve 140 serves like the venting valve 145 to relieve overpressure, here possible overpressure in the prechamber gas fuel supply line 160 in case that the engine 5 stopped. Accordingly, this venting valve 140 is constructed to relieve overpressure in the line 160 over a longer duration, namely several minutes.

Neither the venting valve 140 nor the venting valve 145 can avoid engine shutdowns of the gas fired engine 5 as a consequence of load rejection events. Only the gas pressure relief valve 60 can be used for avoiding engine shutdowns as a consequence of load rejection events. The reason is that the gas pressure relief valve 60 is constructed to relieve gas in the conduit 35 so quick that in event of a load rejection event the engine stops, the necessary minimal pressure differential between the injection gas pressure (in the main chamber fuel manifold and/or the gas fuel supply conduit 35) and the intake air pressure of the engine 5 is above the predetermined threshold. Accordingly, the pressure relief valve 60 is able to relieve gas rapidly in a sufficient amount.

INDUSTRIAL APPLICABILITY

The exemplary embodiment of the present disclosure as shown in FIG. 1 may operate as follows. The gas fuel source 30 supplies gas at a high pressure. Via the gas pressure regulating unit 15 the high gas fuel pressure may be reduced to an appropriate level, e.g. an appropriate injection pressure. It has to be noted that the gas pressure regulating unit 15 may comprise several gas pressure regulating devices or pressure regulators. All these gas pressure regulators may be configured so that an appropriate gas fuel pressure may be obtained at the gas pressure regulating unit outlet 25. Consequently, the gas fuel at the reduced gas pressure, for example, the injection pressure, flows within the gas supply conduit 35 to the one or more gas admission valves 40. In particular, these gas admission valves 40 may be configured as SOGAVs as outlined in the introductory part of this description. The gas admission valves 40 are controlled by e.g. the engine control module 70 so that gas at the injection pressure is admitted to be supplied to the associated combustion chamber 10 at a predetermined time for a predetermined duration. The time and the duration may be adjusted to ensure an appropriate operation of the gas fired engine 5. The intake air may be supplied by a unit or device well known in the art (not shown).

These admission valves, and in particular the SOGAVs require that the pressure differential between the higher pressure gas and the intake air for the engine be less than a predetermined threshold, for example 150 kPa.

As a result of an instantaneous load change, where the engine runs at relatively high load and then suddenly under a low load, the engine can over-speed. As a result, the speed governor reduces the actuation duration of the admission valves (e.g. SOGAVs), which causes the regulated gas pressure to overshoot. At the same time, air pressure in the intake line drops due to the lower exhaust volume driving, for example, a turbo (due to lower fuel injection despite the over-speed). It could happen that the pressure differential between the high pressure gas and the intake air is above said threshold and the admission valves cannot resume normal fuel injection behaviour once the engine is no longer in an over-speed condition. Consequently, the engine may completely shut down due to the inability to resume fuel injection. In the present technical field of gas fired engines and, e.g. natural gas fired engines, the tank pressure or fuel supply line pressure may be greater than the pressure seen at the SOGAVs, the fuel already gone through the gas pressure regulating unit, e.g. a pressure regulator. Accordingly, the cause for an engine shutdown as a consequence of a load rejection event was determined as engine over speed and/or a gas pressure overshoot. Identified reasons for an engine overspeed event may be a slow speed governor response and/or inertial energy of a fly wheel of the engine 5.

As already mentioned above, SOGAVs 40 can only actuate with an actual pressure difference in the main chamber (MC gas pressure—air pressure)<150 kPa. The main chamber gas pressure may be normally controlled to be 100 kPa above air pressure. Due to sudden speed change a speed governor quickly reduces the SOGAV duration. Due to gas pressure regulation inertial response, the gas pressure overshoots. Same time the air pressure drops rapidly, due to turbo surge and reduced energy input. Consequently the SOGAV differential pressure rises rapidly above the limit of 150 kPa. When engine speed recovers and gets back to desired speed and below, the electronic control module 70 increases the SOGAV duration, but SOGAVs effectively cannot open. Consequentially, the speed further drops and the engine 5 dies. The electronic control module calculated power output is high in this recovery, but actually no combustion takes place and the detonation sensors do not see any combustion signal. Consequentially the engine shuts down due "Detonation Sensor Failure".

A standard gas pressure regulating unit 15 may be equipped with a fuel pressure relief valve (not shown), that opens at any shutdown event to relieve fuel pressure into atmosphere and therefore prevent unburned fuel to remain inside the engine 5. As the used fuel pressure relief valve may be very small, the pressure drop rate is low.

According to the present disclosure, the gas pressure relief valve 60, that will allow rapid pressure relieve, may be sized by calculation. This pressure relieve valve 60 may be placed between the gas pressure regulating unit outlet 25 and the engine gas inlet 6. The gas pressure relief valve outlet may be piped to vent into e.g. atmosphere (outside building). The gas pressure relief valve 60 may to be actuated at the right time and for the right duration by the electronic control module 70 (relay output). The gas pressure relief valve 70 may be normally closed/closed at no current. A chosen gas pressure relief valve may be an electro-pneumatic valve DN65. The gas pressure relief valve 70 may be of the same type as a GSOV for the main chamber line of the gas pressure control unit 15 (DN100).

Summarizing, the present disclosure may focus on incorporating a pressure relief device, e.g. a pressure relief valve 60, that simply dumps some of the gas pressure upstream of the SOGAVs 40 either to the exhaust stream or directly outside of the engine, for example outside of the building.

An exemplary embodiment of a method for avoiding engine shutdowns of a gas fired engine 1 as a consequence of load reduction events may comprise the step of reducing the gas pressure upstream of the gas admission valves 40, if a pressure differential between injection gas pressure and the intake air is above a predetermined threshold, e.g. 150 kPa. The predetermined threshold may be set against the type of the gas admission valve 40. In particular, in an exemplary embodiment of a gas fuel admission system 1 in accordance with the present disclosure, the gas pressure relief device may comprise a gas pressure relief valve 60. The gas pressure relief valve may be configured as an electro-pneumatic valve 60.

Figure 3:
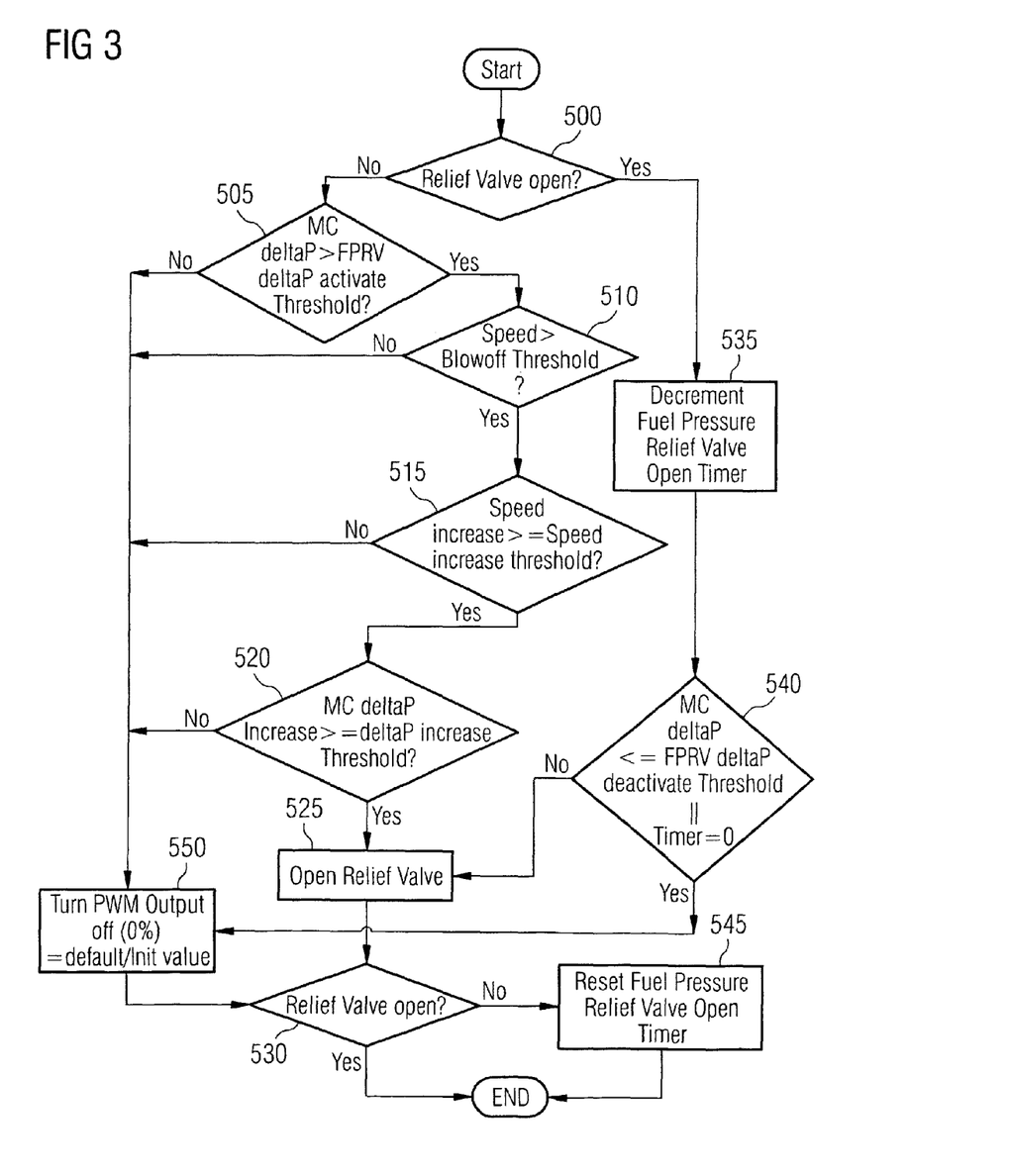
FIG. 3 shows a schematic flow diagram of a method for avoiding engine shutdowns of a gas fired engine as a consequence of load rejection events.

FIG. 3 shows a schematic flow diagram of an exemplary embodiment of an implemented method for avoiding engine shutdowns of a gas fired engine 5 as a consequence of load rejection events. Here, in a first method step, query 500 appears. In the query 500 it is checked whether or not the gas pressure relief valve 60 is open or not. In this respect, it must be pointed out that the gas pressure relief valve 60 may be biased by a biasing means, e.g. a spring, so that no gas can leak from the gas supply conduit 35, i.e. only in case the valve 60 is actively opened, e.g. by supplying a current to an associated solenoid in accordance to a corresponding control signal from, e.g. the engine control module 70, the gas pressure relief valve 60 will be opened. If no current is supplied to the associated solenoid, the gas pressure relief valve 60 is closed. Hence, only in case that the method according to FIG. 3 was already conducted, the gas pressure relief valve 60 may be open.

If the query 500 is answered with NO, a query 505 may follow. Here, it is checked whether the main chamber differential pressure (MCdeltaP), i.e. the difference of the gas pressure in the main chamber manifold and/or in the gas supply conduit 35 minus the intake air pressure, is larger than a predetermined threshold. Said predetermined threshold may be identical with the predetermined threshold mentioned above (specified by the kind of SOGAV or SOGAVs used) or it is the predetermined threshold mentioned above minus a safety margin, e.g. about 7%, i.e. provided that a minimal pressure difference of 150 kPa is required by the SOGAVs for their proper functioning, the threshold may be 150 kPa minus about 7%=140 kPa.

If the answer of query 505 is NO, a step 550 may follow. In this step 550, the current of the solenoid of the gas pressure relief vale 60 is set to zero so that the gas pressure relief valve 60 is certainly closed. Then a query 530 may follow, in which it is checked whether or not the gas pressure relief valve 60 is open. If the answer is NO, a fuel pressure relief valve open timer may be reset to zero. If the answer is YES, the program may end.

In case that the query 505 is answered with YES, a query 510 may follow, in which it is checked whether or not the engine speed of the engine 5 is greater than a blowoff threshold. In case that the answer is NO, the step 550 may follow. If the answer is YES, a query 515 may follow. In query 515 it may be queried whether or not an engine speed increase is equal to or greater than a speed increase threshold. In case that the answer is NO, the step 550 may follow.

If the answer is NO, a query 520 may follow. In the query 520 it may be queried whether a main chamber differential pressure increase (MCdeltaP increase, i.e. the derivation of the temporal variation of MCdeltaP) is equal to or greater than a pressure differential increase threshold. If the answer is YES, a step 530 may follow in which the gas pressure relief valve 60 is opened. If the answer is NO, the step 550 may follow again.

In case that the answer for query 500 is YES, then a step 535 may follow. In this step, a fuel pressure relief valve open timer may be decremented. By the fuel pressure relief valve open timer it can be certain that the gas pressure relief valve 60 is open only for a predetermined time limit. Subsequently, a query 540 may follow, in which it is checked whether or not MCdeltaP is equal to or less than a predetermined deactivate threshold. This predetermined deactivate threshold may be set so its value is less than the predetermined threshold of query 505. The value of the deactivate threshold may be 120 kPa. In query 540 it is further checked whether the fuel pressure relief valve open timer is zero. If query 540 is answered with YES, i.e. the McdeltaP is equal to or less than the deactivate threshold and/or the timer is zero, the step 550 may follow. IF the answer of query 540 is NO, the step 525 may follow. In step 525, the gas pressure relief valve 60 is opened. Subsequently, the query 530 may follow. For the further steps and queries we refer to the explanations above.

As explained by means of the flow diagram shown in FIG. 3 this exemplary embodiment of a method for avoiding engine shutdowns of a gas fired engine 5 as a consequence of load rejection events may comprise not only the query 505, but the further queries 510, 515, 520, e.g. whether or not an engine speed is above a predetermined threshold, an engine speed increase is equal to or above a speed increase threshold, and the main chamber pressure differential increase is equal to or greater than a pressure differential increase threshold.

Finally, it is to be noted that the method shown in FIG. 3 may be conducted on a rate of, for example, 10 to 50 ms, in particular e.g. every 30 ms, i.e. method start again with query 500 every 30 ms.

The following list of parameters is exemplary only and must not be used to limit the present disclosure:

| Configuration Parameter | default | range |
|---|---|---|
| FPRV Speed/Blowoff Threshold | Rated speed +50 Rpm * | 0-200 rpm |
| FPRV Speed increase threshold "ΔN" | 0 rpm/sec | 0-500 rpm/sec |
| Main chamber differential increase threshold "Δ(MC ΔP)" | 20 kPa/sec | 0-500 kPa/sec |
| FPRV Main chamber differential Threshold "FPRV ΔP activate threshold" | 140 kPa | 0-500 kPa |
| FPRV Main Chamber differential Close Threshold "FPRV ΔP deactivate threshold" | 120 kPa | 0-500 kPa |
| FPRV timeout | 10 sec | 0-60 sec |

The invention claimed is:

1. A gas fuel admission system for a gas fired engine having at least one combustion chamber supplied with intake air having an intake air pressure, the gas fuel admission system comprising:
a gas pressure regulating unit including a gas pressure regulating unit inlet and a gas pressure regulating unit outlet, the gas pressure regulating unit being configured to receive gas at a supply pressure at the gas pressure regulating inlet and to discharge the gas at an injection pressure at the gas pressure regulating unit outlet;
a gas supply conduit;
an engine gas inlet configured to direct gas into the at least one combustion chamber;
a gas admission valve having a valve inlet and a valve outlet, the valve inlet being fluidly connected to the gas pressure regulating unit outlet via the gas supply conduit and the valve outlet being fluidly connected to the engine gas inlet, the gas admission valve being configured to admit the gas having the injection pressure at a predetermined time for a predetermined duration into the engine gas inlet;
a gas pressure relief device fluidly connected to the gas conduit, the gas pressure relief device being configured to relieve overpressure of the gas in the gas supply conduit, if a pressure differential between the injection gas pressure and the intake air pressure is above a predetermined threshold;
an engine control module configured to control the gas admission valve so that gas to be burnt in the at least one combustion chamber of the gas fired engine is admitted into the at least one combustion chamber;
a first sensing device configured to sense the injection gas pressure; and
a second sensing device configured to sense the intake air pressure;
wherein the engine control module is further configured to communicate with both the first sensing device and the second sensing device;
wherein the engine control module is further configured to check whether or not the engine speed of the gas fired engine is above a predetermined blowoff threshold, and/or whether or not an engine speed increase is equal to or greater than a predetermined speed increase threshold, and/or whether or not a pressure differential increase of the pressure differential between the injection gas pressure and the intake air pressure is above a predetermined pressure differential increase threshold;
wherein the engine control module is further configured to control the gas pressure relief device so that the gas pressure relief device relieves overpressure of the gas in the gas conduit only, if:
  a1) the engine speed of the gas fired engine is above the predetermined blowoff threshold, and/or
  b1) the engine speed increase is equal to or greater than the predetermined speed increase threshold, and/or
  c1) the pressure differential increase of the pressure differential between the injection gas pressure and the intake air pressure is above the predetermined pressure differential increase threshold,
  and
  d1) the pressure differential between the injection gas pressure sensed by the first sensing device and the intake air pressure sensed by the second sensing device is above the predetermined threshold.

2. The gas fuel admission system of claim 1, wherein the gas pressure relief device comprises a gas pressure relief valve.

3. The gas fuel admission system of claim 2, wherein the gas pressure relief valve is configured as an electro-pneumatic valve.

4. The gas fuel admission system of claim 1, wherein the gas admission valve is configured as a solenoid operated gas admission valve.

5. The gas fuel admission system of claim 2, wherein the gas fired engine is a natural gas fired engine.

6. The gas fuel admission system of claim 1, further comprising a venting valve connected to the gas conduit, the venting being configured to relieve overpressure of the gas in the gas supply conduit independently of the gas pressure relief device.

7. The gas fuel admission system of claim 6, wherein the gas pressure relief device is configured to relieve overpressure of the gas in the gas supply conduit more rapidly than the venting valve.

8. The gas fuel admission system of claim 1, wherein:
the predetermined threshold for the pressure differential between the injection gas pressure and the intake air pressure is a first predetermined pressure threshold; and
after the engine control module controls the gas pressure relief device so that the gas pressure relief device relieves overpressure of the gas in the gas conduit, the engine control module controls the gas pressure relief device to cease relieving pressure of the gas in the gas conduit only if the pressure differential between the injection gas pressure and the intake air pressure falls below a second predetermined pressure threshold, the second predetermined pressure threshold being lower than the first predetermined pressure threshold.

9. The gas fuel admission system of claim 1, wherein:
the predetermined threshold for the pressure differential between the injection gas pressure and the intake air pressure is a first predetermined pressure threshold; and
after the engine control module controls the gas pressure relief device so that the gas pressure relief device relieves overpressure of the gas in the gas conduit, the engine control module controls the gas pressure relief device to cease relieving pressure of the gas in the gas conduit only if
the pressure differential between the injection gas pressure and the intake air pressure falls below a second predetermined pressure threshold, the second predetermined pressure threshold being lower than the first predetermined pressure threshold and the gas pressure relief device has been relieving pressure of the gas in the gas conduit for at least a predetermined period.

10. The gas fuel admission system of claim 1, wherein after the engine control module controls the gas pressure relief device so that the gas pressure relief device relieves overpressure of the gas in the gas conduit, the engine control module controls the gas pressure relief device to cease relieving pressure of the gas in the gas conduit only if the gas pressure relief device has been relieving pressure of the gas in the gas conduit for at least a predetermined period.

11. A power generation unit comprising:
   at least one electric generator configured to convert mechanical energy into electrical energy;
   at least one gas fired engine configured to drive directly or indirectly the at least one electric generator; and
   a gas fuel admission system for the at least one gas fired engine, including
      a gas pressure regulating unit including a gas pressure regulating unit inlet and a gas pressure regulating unit outlet, the gas pressure regulating unit being configured to receive gas at a supply pressure at the gas pressure regulating inlet and to discharge the gas at an injection pressure at the gas pressure regulating unit outlet;
      a gas supply conduit;
      an engine gas inlet configured to direct gas into the at least one combustion chamber;
      a gas admission valve having a valve inlet and a valve outlet, the valve inlet being fluidly connected to the gas pressure regulating unit outlet via the gas supply conduit and the valve outlet being fluidly connected to the engine gas inlet, the gas admission valve being configured to admit the gas having the injection pressure at a predetermined time for a predetermined duration into the engine gas inlet;
      a gas pressure relief device fluidly connected to the gas conduit, the gas pressure relief device being configured to relieve overpressure of the gas in the gas supply conduit, if a pressure differential between the injection gas pressure and the intake air pressure is above a predetermined threshold;
      an engine control module configured to control the gas admission valve so that gas to be burnt in the at least one combustion chamber of the gas fired engine is admitted into the at least one combustion chamber;
      a first sensing device configured to sense the injection gas pressure; and
      a second sensing device configured to sense the intake air pressure;
      wherein the engine control module is further configured to communicate with both the first sensing device and the second sensing device;
      wherein the engine control module is further configured to check whether or not the engine speed of the gas fired engine is above a predetermined blowoff threshold, and/or whether or not an engine speed increase is equal to or greater than a predetermined speed increase threshold, and/or whether or not a pressure differential increase of the pressure differential between the injection gas pressure and the intake air pressure is above a predetermined pressure differential increase threshold;
      wherein the engine control module is further configured to control the gas pressure relief device so that the gas pressure relief device relieves overpressure of the gas in the gas conduit only, if:
         a1) the engine speed of the gas fired engine is above the predetermined blowoff threshold, and/or b1) the engine speed increase is equal to or greater than the predetermined speed increase threshold, and/or c1) the pressure differential increase of the pressure differential between the injection gas pressure and the intake air pressure is above the predetermined pressure differential increase threshold,
and
d1) the pressure differential between the injection gas pressure sensed by the first sensing device and the intake air pressure sensed by the second sensing device is above the predetermined threshold.

12. The gas fuel admission system of claim 11, wherein the gas pressure relief device comprises a gas pressure relief valve.

13. The gas fuel admission system of claim 12, wherein the gas pressure relief valve is configured as an electro-pneumatic valve.

14. The gas fuel admission system of claim 11, wherein the gas admission valve is configured as a solenoid operated gas admission valve.

15. The gas fuel admission system of claim 12, wherein the gas fired engine is a natural gas fired engine.

16. The gas fuel admission system of claim 11, further comprising a venting valve connected to the gas conduit, the venting being configured to relieve overpressure of the gas in the gas supply conduit independently of the gas pressure relief device.

17. The gas fuel admission system of claim 16, wherein the gas pressure relief device is configured to relieve overpressure of the gas in the gas supply conduit more rapidly than the venting valve.

18. A method for avoiding engine shutdowns of a gas fired engine as a consequence of load rejection events, the gas fired engine comprising at least one gas admission valve configured to admit the gas having an injection pressure at a predetermined time for a predetermined duration into an engine gas inlet, a gas pressure regulating unit outlet, and a gas supply conduit connecting the gas pressure regulating unit outlet and the at least one gas admission valve,
   the method comprising:
   a) checking whether or not the engine speed of the reducing gas fired engine is above a predetermined blowoff threshold, and/or
   b) checking whether or not an engine speed increase is equal to or greater than a predetermined speed increase threshold, and/or
   c) checking whether or not a pressure differential increase of the pressure differential between the injection gas pressure and the intake air pressure is above a predetermined pressure differential increase threshold,
   and
   d) reducing the gas pressure in the gas supply conduit only, if:
      a1) the engine speed of the reducing gas fired engine is above the predetermined blowoff threshold, and/or
      b1) the engine speed increase is equal to or greater than the predetermined speed increase threshold, and/or
      c1) the pressure differential increase of the pressure differential between the injection gas pressure and the intake air pressure is above the predetermined pressure differential increase threshold,
      and
      d1) the pressure differential between the injection gas pressure and the intake air pressure is above a predetermined threshold.

19. The method of claim 18, wherein reducing the gas pressure in the gas supply conduit includes reducing the gas pressure in the gas supply conduit until the gas pressure in the gas supply conduit reaches a level below the predetermined threshold.

20. The method of claim 18, wherein reducing the gas pressure in the gas supply conduit includes reducing the gas pressure in the gas supply conduit for at least a predetermined period.

\* \* \* \* \*